(12) United States Patent
Godon et al.

(10) Patent No.: US 9,605,364 B2
(45) Date of Patent: Mar. 28, 2017

(54) METHOD FOR PRODUCING A FIBROUS METAL STRUCTURE BY MEANS OF WEAVING

(75) Inventors: Thierry Godon, Sevran (FR); Bruno Jacques Gérard Dambrine, Le Châtelet-en-Brie (FR); Alain Robert Yves Perroux, Ris Orangis (FR)

(73) Assignee: SNECMA, Paris (FR)

( * ) Notice: Subject to any disclaimer, the term of this patent is extended or adjusted under 35 U.S.C. 154(b) by 611 days.

(21) Appl. No.: 13/878,657

(22) PCT Filed: Oct. 10, 2011

(86) PCT No.: PCT/FR2011/052361
§ 371 (c)(1),
(2), (4) Date: Apr. 10, 2013

(87) PCT Pub. No.: WO2012/049414
PCT Pub. Date: Apr. 19, 2012

(65) Prior Publication Data
US 2013/0186507 A1    Jul. 25, 2013

(30) Foreign Application Priority Data

Oct. 11, 2010 (FR) ...................... 10 58237

(51) Int. Cl.
*B21F 27/12* (2006.01)
*D03D 15/02* (2006.01)
(Continued)

(52) U.S. Cl.
CPC .......... *D03D 15/02* (2013.01); *B21F 27/128* (2013.01); *B64C 11/26* (2013.01); *D03D 13/00* (2013.01);
(Continued)

(58) Field of Classification Search
CPC ........ D03D 3/08; D03D 13/00; D03D 13/004; D03D 15/00; D03D 15/02; D03D 15/016;
(Continued)

(56) References Cited

U.S. PATENT DOCUMENTS 302,306 A * 7/1884 Worcester ........................ 140/10
3,249,126 A * 5/1966 Gerlach et al. .................. 139/22
(Continued)

FOREIGN PATENT DOCUMENTS

EP    1 908 919 A1    4/2008
FR    2 939 130        6/2010
(Continued)

OTHER PUBLICATIONS

International Search Report as issued for PCT/FR2011/052361.

*Primary Examiner* — Edward Tolan
(74) *Attorney, Agent, or Firm* — Pillsbury Winthrop Shaw Pittman LLP

(57) ABSTRACT

A method for the production of a fibrous metal structure by weaving with metal weft yarns and metal warp yarns. The method includes weaving the fibrous structure by successive weaving of metal clasps that are used as weft yarns. For the purpose of weaving, each of the arms of each of the metal clasps is introduced into at least one shed, each shed being formed by two warp yarns.

6 Claims, 3 Drawing Sheets

(51) Int. Cl.
  *B64C 11/26* (2006.01)
  *D03D 13/00* (2006.01)
  *D03D 23/00* (2006.01)
  *D03D 25/00* (2006.01)
  *F04D 29/02* (2006.01)
  *F04D 29/32* (2006.01)
  *F01D 5/14* (2006.01)

(52) U.S. Cl.
  CPC ........... *D03D 23/00* (2013.01); *D03D 25/005* (2013.01); *F01D 5/147* (2013.01); *F04D 29/023* (2013.01); *F04D 29/324* (2013.01); *D10B 2101/20* (2013.01); *D10B 2505/02* (2013.01); *F05D 2240/303* (2013.01); *F05D 2300/133* (2013.01); *F05D 2300/2261* (2013.01); *F05D 2300/614* (2013.01); *Y02T 50/66* (2013.01); *Y10T 29/49321* (2015.01)

(58) Field of Classification Search
  CPC .......... D03D 15/0083; D03D 15/0088; D03D 2700/80; D03D 25/005; F01D 5/147; B21F 15/00; B21F 15/02; B21F 15/06; B21F 27/00; B21F 27/005; B21F 27/02; B21F 27/128; B21F 27/10; B21F 33/02; B21F 27/12
  USPC ....... 139/116.1, 408; 140/10, 11, 12, 13, 14, 140/15
  See application file for complete search history.

(56) References Cited

U.S. PATENT DOCUMENTS

| | | | | |
|---|---|---|---|---|
| 3,376,001 A | * | 4/1968 | Wieme | ............................. 245/3 |
| 3,414,666 A | * | 12/1968 | Doundoulakis | ........ H01B 7/083 |
| | | | | 174/117 M |
| 3,722,355 A | * | 3/1973 | King | ............................ 89/36.02 |
| 3,961,652 A | * | 6/1976 | Hasuda et al. | ............ 139/384 B |
| 4,001,478 A | * | 1/1977 | King | ............................. 442/205 |
| 5,104,726 A | * | 4/1992 | Ross | ............................. 442/207 |
| 5,127,444 A | * | 7/1992 | Takano et al. | .................. 139/52 |
| 5,270,094 A | * | 12/1993 | Anahara et al. | .............. 428/113 |
| 5,456,974 A | * | 10/1995 | Lundblad et al. | ............ 442/206 |
| 6,123,115 A | * | 9/2000 | Greenhalgh | ................ 139/196.1 |
| 6,739,937 B2 | * | 5/2004 | Snelson | ................. A63H 33/10 |
| | | | | 446/107 |
| 8,153,539 B2 | * | 4/2012 | Coupe et al. | .................. 442/207 |
| 8,419,374 B2 | * | 4/2013 | Huth | ...................... B29C 70/24 |
| | | | | 416/224 |
| 8,505,588 B2 | * | 8/2013 | Coupe et al. | .................... 139/11 |
| 8,726,479 B2 | * | 5/2014 | Kufferath-Kassner | ... D03D 3/08 |
| | | | | 139/383 R |
| 2002/0069927 A1 | * | 6/2002 | Bryn | ............................... 139/48 |
| 2005/0271235 A1 | * | 12/2005 | Ko | ............................ H04R 1/06 |
| | | | | 381/384 |
| 2006/0216154 A1 | * | 9/2006 | McMillan | ............... F01D 5/282 |
| | | | | 416/241 R |
| 2007/0095012 A1 | * | 5/2007 | Kang | ...................... B21F 27/12 |
| | | | | 52/750 |
| 2008/0237405 A1 | | 10/2008 | Beck | |
| 2009/0111346 A1 | | 4/2009 | Kufferath-Kassner et al. | |
| 2012/0151868 A1 | * | 6/2012 | Kang | .................... B21F 27/128 |
| | | | | 52/649.1 |

FOREIGN PATENT DOCUMENTS

| | | |
|---|---|---|
| GB | 313 947 | 1/1930 |
| GB | 830 908 | 3/1960 |
| SU | 895852 A1 | 1/1982 |

\* cited by examiner

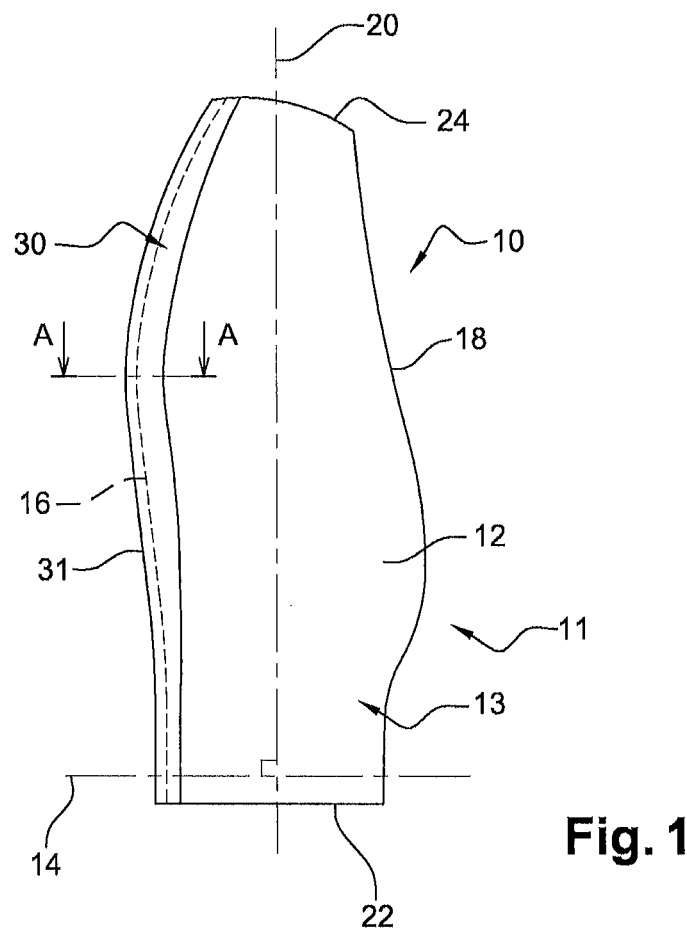
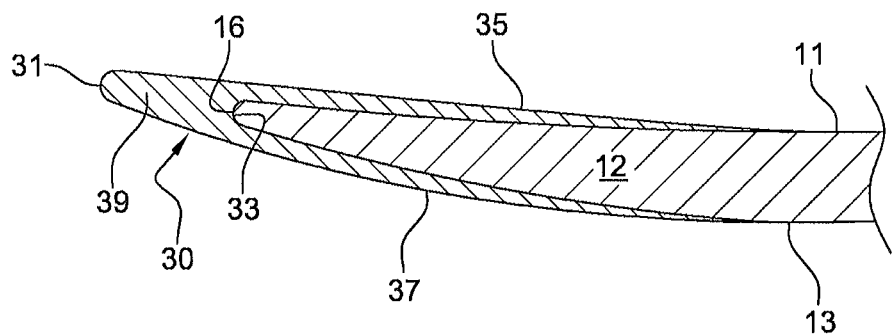

METHOD FOR PRODUCING A FIBROUS METAL STRUCTURE BY MEANS OF WEAVING

CROSS-REFERENCE TO RELATED APPLICATIONS

This is the U.S. National Stage of PCT/FR2011/052361, filed Oct. 10, 2011, which in turn claims priority to French Patent Application No. 1058237, filed Oct. 11, 2010, the entire contents of all applications are incorporated herein by reference in their entireties.

The present invention relates to a method of producing a fibrous metal structure by means of weaving permitting the production of a solid part, such as for example a metal reinforcement for a turbine engine blade.

More particularly, the invention relates to a method of production by weaving that permits the production of a metal reinforcement of the leading edge of a turbine engine blade.

The field of the invention is that of turbine engines and more particularly that of fan blades, made of composite or metal material, of a turbine engine and whereof the leading edge comprises a metal structural reinforcement.

However, the invention also applies to the production of a metal reinforcement intended to reinforce a leading edge or a trailing edge of any kind of turbine engine, terrestrial or aeronautic, and in particular a turbine engine of a helicopter or an aircraft turbojet engine, but also open rotor propellers.

The invention also applies to the production of any solid parts having a complex geometrical shape.

It will be recalled that the leading edge corresponds to the front part of an aerodynamic profile which faces the air flow and which divides the air flow into a lower-surface air flow and an upper-surface air flow. The trailing edge corresponds to the rear part of an aerodynamic profile where the lower-face and upper-face flows are united.

The turbine engine blades, and in particular the fan blades, undergo considerable mechanical stresses, associated in particular with the rotational speed, and have to comply with strict conditions concerning weight and space requirement.

Consequently, use is made of blades made of composite materials which are lighter and which have a better resistance to heat.

It is known to provide the fan blades of a turbine engine, produced in composite materials, with a metal structural reinforcement extending over the whole height of the blades and beyond their leading edge, as mentioned in document EP 1908919. Such a reinforcement permits the composite blades to be protected during an impact of a foreign body on the fan, such as for example a bird, hail or stones.

In particular, the metal structural reinforcement protects the leading edge of the composite blade by preventing risks of delamination, fibre rupture or damage due to fibre/matrix de-cohesion.

Conventionally, a turbine engine blade comprises an aerodynamic surface extending, in a first direction, between a leading edge and a trailing edge and, in a second direction essentially perpendicular to the first direction, between a foot and a head of the blade. The metal structural reinforcement assumes the shape of the leading edge of the aerodynamic surface of the blade and extends in the first direction beyond the leading edge of the aerodynamic surface of the blade assuming the shape of the profile of the lower face and the upper face of the blade and in the second direction between the foot and the head of the blade.

In a known manner, the metal structural reinforcement is a metal part made of titanium produced entirely by milling from a block of material.

However, the metal reinforcement of a leading edge of a blade is a part that is complex to produce, requiring numerous complex reworking and tooling operations involving high production costs.

It is known to produce solid parts, and in particular metal reinforcements for a turbine engine blade, from a three-dimensional fibrous metal structure produced by weaving metal threads and by a method of hot isostatic pressing in a tool causing the agglomeration of the metal threads of the fibrous metal structure in such a way as to obtain a solid part; this method is described in patent application FR0858098.

Conventionally, the weaving of the fibrous structure is carried out by means of weaving with a plurality of metal warp threads and weft threads, wherein the diameter of the threads is of the order of several tens of millimeters, typically between 0.1 mm and 0.3 mm.

The fibrous structure thus obtained by weaving is a plane relatively rigid structure which has to be deformed to obtain a preformed fibrous structure so as to permit its introduction into a shaping tool.

In the context of producing a turbine engine blade reinforcement, the fibrous structure is woven with threads based on titanium which are difficult to shape, especially on account of the high elastic limit of titanium.

This is why the fibrous structure is deformed by means of a specific tool, such as a bending press, before it is put place in the tool. The size of the fibrous structure to be preformed is therefore dependent on the dimensions of the bending press. Thus, the weaving dimensions of the fibrous structures are directly limited by the capacity of the bending press available on site.

In this context, the invention aims to solve the aforementioned problems by proposing a method of weaving making it possible to obtain fibrous structures having large dimensions and not being dependent on the capacity of the available deformation tool.

For this purpose, the invention proposes a method of production of a fibrous metal structure by means of weaving with metal weft threads and metal warp threads, characterised in that it comprises a step of weaving said fibrous structure by successive weaving of metal clasps acting as weft threads, said weaving being carried out by the introduction of each of the arms of each of said metal clasps into at least one shed, each shed being formed by two warp threads.

Clasp is understood to mean a curved or bent metal part, such as a metal wire, comprising two end arms connected by a joining element in such a way as to form, for example, an essentially U-shaped or V-shaped part.

Shed is understood to mean a space formed by two warp threads permitting the introduction of a weft thread.

Thanks to the invention, it is possible in a straightforward manner to produce a fibrous structure of large size, the shape whereof is provided during the weaving step by the shape of the clasps acting as weft threads. Thus, the method according to the invention makes it possible to carry out weaving of a three-dimensional fibrous structure.

Thus, according to the invention, the weaving of each of the arms of the clasp into a shed of two warp threads is carried out into different weaving planes. These weaving planes can be parallel or not, the arrangement of the weaving planes of the two arms depending on the shape of the clasp.

The method according to the invention thus makes it possible to eliminate an independent step for deformation of the fibrous structure by means of a relatively costly specific tool which, by its dimensions, limits the dimensions of the fibrous structure.

Thus, in order for example to produce a metal reinforcement of a turbine engine blade, it is sufficient simply to position the woven fibrous structure in a shaping tool to produce the final part by means of a hot compaction method.

The preform of the fibrous structure is provided by the weaving step in itself; the method does not therefore require a subsequent step for deformation of the fibrous structure by cold and/or hot forging with a tool, such as a bending press, in order to impose a particular angle on the fibrous structure.

The method of producing a fibrous metal structure according to the invention can also comprise one or more of the following features, considered individually or in any technically possible combinations:

prior to said weaving step, said method comprises a step for producing said metal clasps by bending metal segments of rectilinear shape;

prior to the bending step, said method comprises a step for cutting a plurality of metal segments;

said metal clasps are then bent during the bending step into a U-shape and/or a V-shape.

The subject-matter of the invention is also a method of producing a solid part, characterised in that it comprises:

the steps for producing a fibrous structure according to the invention;

a step for hot isostatic pressing of said fibrous structure causing the agglomeration of the metal threads of said fibrous structure so as to produce a solid part.

Said solid part is advantageously a metal reinforcement of the leading edge or trailing edge of the fan blade of a turbine engine.

Said solid part is advantageously a metal reinforcement of a propeller.

The subject-matter of the invention is also a fibrous structure produced by the method of production according to the invention, characterised in that it is formed by a plurality of woven warp threads and a plurality of woven weft threads, the weft threads being formed by preformed metal clasps.

Said plurality of warp threads and said plurality of weft threads are advantageously metal threads based on titanium and/or SiC-titanium threads and/or SiC-boron threads and/or SiC—SiC threads.

Other features and advantages of the invention will emerge more clearly from the description thereof given below, by way of indication and on no account limiting, making reference to the appended figures, amongst which:

FIG. 1 is a side view of a blade comprising a metal structural reinforcement of a leading edge obtained from a fibrous structure by means of the method of production according to the invention;

FIG. 2 is a partial cross-sectional view of FIG. 1 in a cross-sectional plane AA;

In all the figures, common elements have the same reference numbers unless stated to the contrary.

FIG. 1 is a side view of a blade comprising a metal structural reinforcement of a leading edge obtained by means of the method of production according to the invention.

Figure 3:
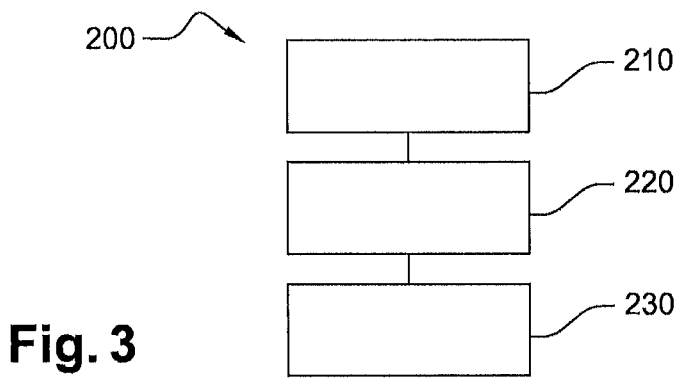
FIG. 3 is a block diagram showing the main steps for the production of a fibrous metal structure of the method according to the invention, for example for producing a metal structural reinforcement of the leading edge of a turbine engine blade.
Figure 4:
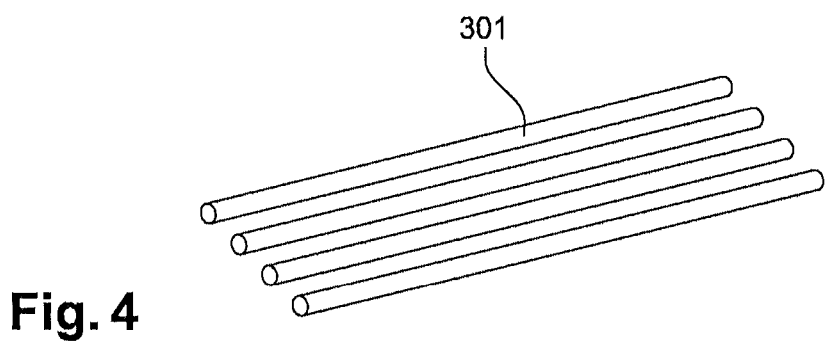
FIG. 4 illustrates a partial view of the fibrous structure during the first step of the method of production according to the invention.
Figure 5:
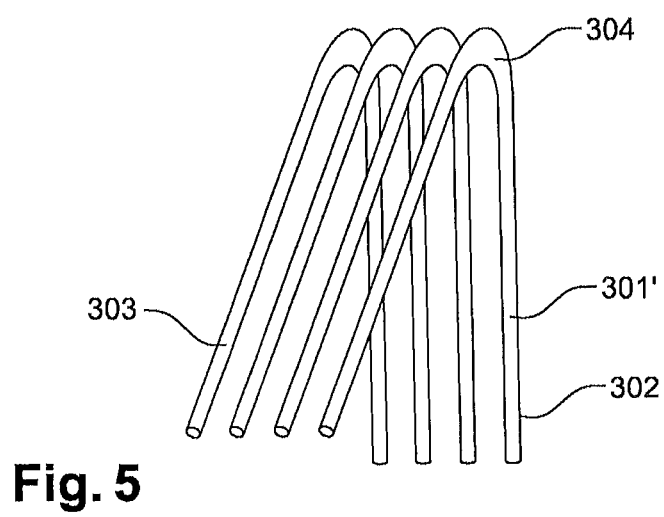
FIG. 5 illustrates a partial view of the fibrous structure during the second step of the method of production according to the invention.

Illustrated blade 10 is for example a mobile fan blade of a turbine engine (not represented).

Blade 10 comprises an aerodynamic surface 12 extending in a first axial direction 14 between a leading edge 16 and a trailing edge 18 and in a second radial direction 20 essentially perpendicular to first direction 14 between a foot 22 and a head 24.

Aerodynamic surface 12 forms an upper surface 13 and a lower surface 11 of blade 10, only upper surface 13 of blade 10 being represented in FIG. 1. Lower surface 11 and upper surface 13 form the lateral faces of blade 10 which connect leading edge 16 to trailing edge 18 of blade 10.

In this embodiment, blade 10 is a composite blade typically obtained by shaping a woven fibrous texture. By way of example, the composite material used can comprise an assembly of woven carbon fibres and a resin matrix, the assembly being formed by moulding by means of a resin injection process of the RTM type (standing for "Resin Transfer Molding") or the VARRTM type (standing for Vacuum Resin Transfer Molding).

Blade 10 comprises a metal structural reinforcement 30 glued at its leading edge 16 and which extends both in first direction 14 beyond leading edge 16 of aerodynamic surface 12 of blade 10 and in second direction 20 between foot 22 and head 24 of the blade.

As represented in FIG. 2, structural reinforcement 30 assumes the shape of leading edge 16 of aerodynamic surface 12 of blade 10 which it extends to form a leading edge 31, so-called leading edge of the reinforcement.

Conventionally, structural reinforcement 30 is a monobloc part having an essentially V-shaped section comprising a base 39 forming leading edge 31 and extended by two lateral sides 35 and 37 respectively assuming the shape of lower surface 11 and upper surface 13 of aerodynamic surface 12 of the blade. Sides 35, 37 have a profile that tapers or thins out in the direction of the trailing edge of the blade.

Base 39 has a rounded internal profile 33 capable of assuming the rounded shape of leading edge 16 of blade 10.

Structural reinforcement 30 is metallic and preferably titanium-based. This material in fact has a great capacity for energy absorption due to impacts. The reinforcement is glued on blade 10 by means of glue known to the person skilled in the art, such as for example a cyanoacrylic glue or epoxy glue.

This type of metal structural reinforcement 30 used for the reinforcement of a composite turbine engine blade is more particularly described in patent application EP 1908919.

The method according to the invention makes it possible to produce in particular a structural reinforcement such as illustrated in FIG. 2, FIG. 2 illustrating reinforcement 30 in its final state.

FIG. 3 represents a block diagram illustrating the main steps of a method of production 200 of a fibrous metal structure 300 making it possible to produce, for example, a metal structural reinforcement 30 of the leading edge of a blade 10 as illustrated in FIGS. 1 and 2.

First step 210 of method of production 200 is a step for cutting a plurality of metal segments 301 from a continuous metal wire, for example coming from a die, whereof the length of each segment 301 is determined as a function of the final piece to be produced. Metal segments 301 thus cut are illustrated in FIG. 1. Each metal segment 301 can thus have a specific length depending on its location in the mesh of the fibrous structure.

The diameter of metal segments 301 can vary depending on the user's requirements and the material thickness needed to produce the part. The determination of the diameter of the segments is made based on a compromise between flexibility of the fibrous structure and the material thickness required in the tool.

Figure 6:
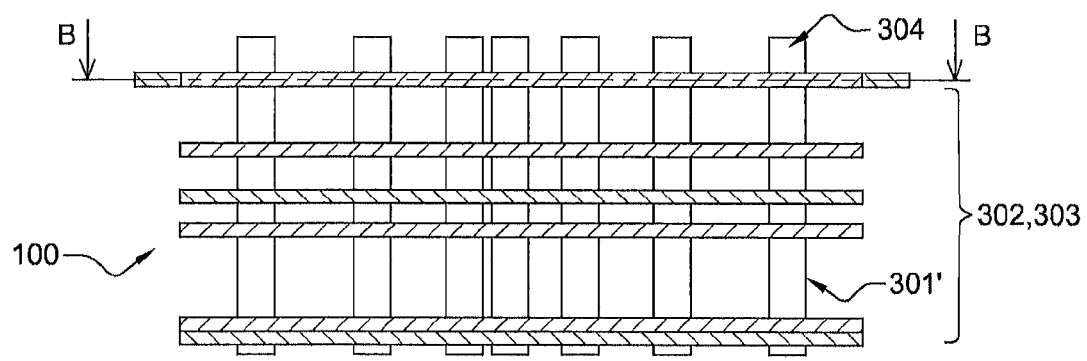
FIG. 6 illustrates diagrammatically a side view of a portion of the fibrous structure during the third step of the method of production according to the invention.

Second step 220 of method of production 200 is a step for cold forming or shaping of metal segments 301 cut during first step 210. This second step is illustrated in FIG. 6.

This second step permits the cold shaping (i.e. at ambient temperature) of each rectilinear metal segment 301 by plastic deformation in such a way as to obtain preformed metal segment 301', the geometry whereof is determined as a function of the final part to be produced and in particular as a function of the shape of the compaction tool used to produce the final part.

Metal segments 301' are deformed by means of a simple tool which can be operated manually, the individual deformation of each segment not requiring consequent hydraulic means to produce the deformation. The deformation tool is advantageously a conventional deformation tool which can be automated and calibrated both with regard to the final shape of metal segments 301' and the pressing force depending on the user's requirements.

Thus, metal segments 301' can be deformed individually or in groups formed by a plurality of metal segments.

Step 220 for deforming the segments thus makes it possible to change from a metal segment 301 of a rectilinear shape to a preformed metal segment 301' in the form of a clasp comprising two essentially rectilinear arms 302 and 303 connected to one another by a joining element 304 having undergone at least one deformation. The lengths of arms 302 and 303 can be different for one and the same clasp. Metal segment 301 can also be entirely or partially crushed (for example by a local thickness restriction) or be obtained from a profile that is not circular, but of a square, rectangular, hexagonal type, etc.

In the context of the embodiment of a metal reinforcement of a turbine engine blade, segments 301' are advantageously bent in a U-shaped or V-shape.

Figure 7:
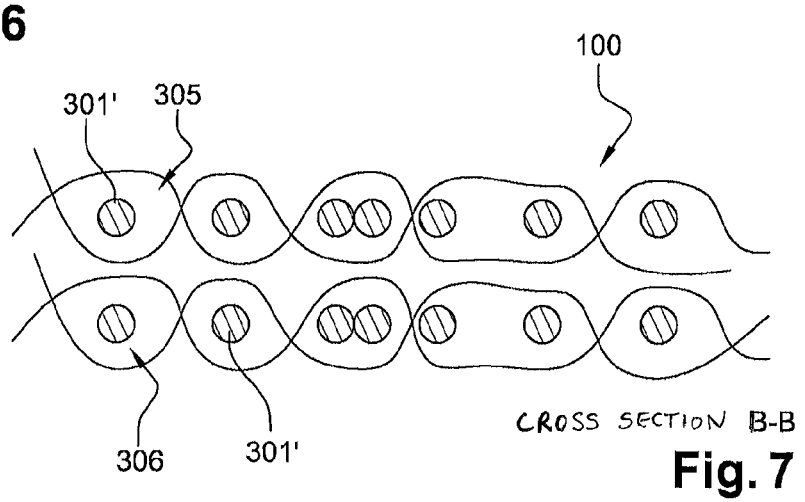
FIG. 7 illustrates diagrammatically a side view of the fibrous structure illustrated in FIG. 6 through an axis B-B.
Figure 8:
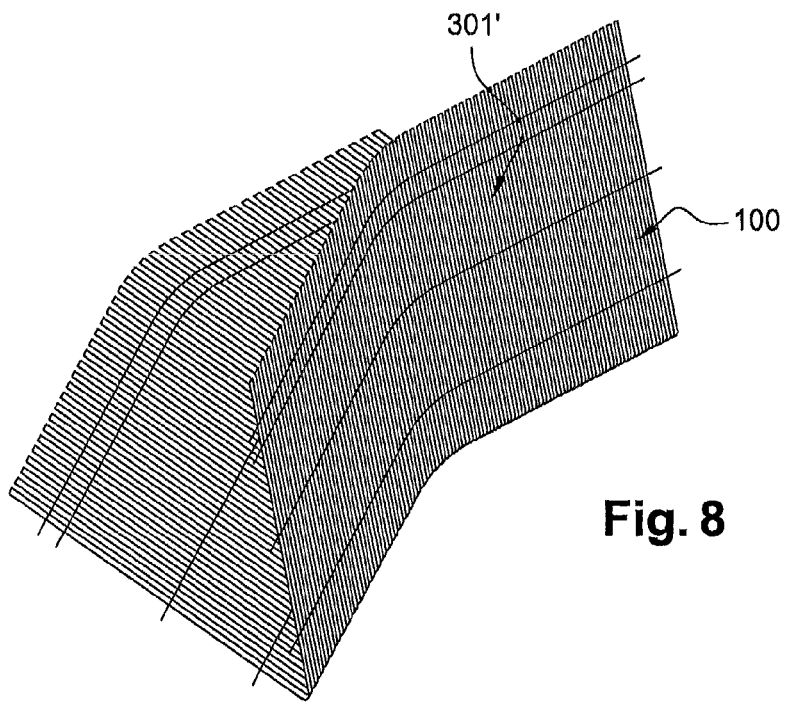
FIG. 8 illustrates a perspective partial view of the final fibrous structure obtained by the method of production according to the invention.

Third step 230 of method of production 200 is a step for three-dimensional weaving of a fibrous structure 100 such as illustrated in FIGS. 6, 7 and 8.

FIG. 6 illustrates diagrammatically a side view of a portion of fibrous structure 100 obtained by weaving metal segments preformed in the second step.

FIG. 7 illustrates diagrammatically a side view of fibrous structure 100 through axis B-B represented in FIG. 7.

Finally, FIG. 8 is a perspective view of a portion of fibrous structure 100 obtained by method of production 200 according to the invention.

Weaving step 230 makes it possible to produce one or more fibrous metal structure(s) 100 in three dimensions so as to produce the final part.

In this regard, fibrous structure 100 is formed by a plurality of "warp threads" and "weft threads", preformed metal segments 301' acting as weft threads in our example of embodiment.

Weaving step 230 is carried out by successive weaving of each preformed metal segment 301' acting as a weft thread into sheds formed by two warp threads.

More precisely, the weaving is carried out by introducing each of arms 302 and 303 of each preformed metal segment 301' into at least one shed 305, 306 formed by two warp threads.

Shed is understood to mean a space formed by two warp threads permitting the introduction of a weft thread.

Weaving step 230 is carried out by means of a weaving tool of the weaving loom type comprising means capable of forming at least two separate sheds 305, 306 opening and closing simultaneously in such a way that the two arms 302, 303 of each preformed metal segment 301' are woven simultaneously into at least two different sheds 305, 306.

Thus, each metal segment 301' is woven by the introduction of each of its arms into at least one shed 305, 306 in such a way as to form fibrous structure 100.

Each preformed metal segment 301' is inserted into sheds 306, 307 by means, for example, of a fork supporting preformed metal segment 301' and positioning it in the corresponding sheds.

The weaving patterns of fibrous structure 100 are conventionally weaving patterns used for example in the area of weaving composite fibres, such as for example weaving patterns of the twill, taffeta, satin type or the weaving patterns described in patent application EP1526285, except that the weft thread is a preformed thread and is not rectilinear.

The metal segments are chiefly titanium-based threads. However, it is possible to incorporate in the weaving metal segments based on silicon carbide and titanium (SiC—Ti), threads coated with boron (SiC-boron thread), or with silicon carbide (SiC—SiC thread).

Generally, the designation of an SiC—Ti or SiC/Ti fibre denotes, for the person skilled in the art, an SiC fibre coated with a titanium-based alloy.

Metal segments 301, 301' essentially have a diameter varying between 0.1 mm and 5 mm.

Fibrous structure 100 is then compacted in a shaping tool by hot isostatic pressing (HIP for Hot Isostatic Pressing in English).

Hot isostatic pressing is a very widely used and known production process for reducing the porosity of metals and influencing the density of numerous metals, such as ceramics. The isostatic pressing process also makes it possible to improve, amongst other things, the mechanical properties and usability of materials.

The isostatic pressing is carried out at high temperature (conventionally between 400° C. and 1400° C., and of the order of 1000° C. for titanium) and at isostatic pressure.

Thus, the application of the heat combined with the internal pressure eliminates the hollow spaces in fibrous structure 100, as well as the microporosities by means of a combination of plastic deformation, plastic flow and diffusion welding in such a way as to form the final part.

In the case of the production of a metal reinforcement of a turbine engine blade, the final part comprises the internal and external profiles of metal reinforcement 30. The produced final part is then removed from the shaping tool.

The isostatic pressing step is carried out under vacuum, advantageously under secondary vacuum, either in a welded tool in which the secondary vacuum is produced, or in an autoclave bag, the choice of the process depending on the number of parts to be produced. The secondary vacuum makes it possible to avoid the presence of oxygen in the tool and in the fibrous structure during the step of isostatic pressing of the titanium.

The tool is produced in a mechanical alloy, a so-called super-alloy or high-performance alloy.

The isostatic pressing can include in advance a step for cleaning, degreasing and/or chemical attack of the fibrous structure so as to eliminate residual impurities of the fibrous structure.

The step for cleaning out impurities is advantageously carried out by immersion of the fibrous assembly in a bath of cleaning agent or chemical agent.

In association with these main production steps, the part after compaction may require finishing and reworking operations by machining so as to produce reinforcement 30. These reworking operations can include:

- an operation for reworking the profile of base 39 of reinforcement 30 in order to refine the same and in particular the aerodynamic profile of leading edge 31;
- an operation for reworking sides 35, 37, this step consisting in particular in trimming sides 35, 37 and in thinning out the lower-surface and upper-surface sides;
- a finishing operation permitting the required surface state to be obtained.

The present invention has been described chiefly with the use of titanium-based metal segments to produce the fibrous structure; however, the method of production is also applicable with any kind of metal material having properties that permit super-plastic shaping and/or diffusion welding.

The invention has been described in particular for the production of a fibrous structure for the production of a metal reinforcement of a composite turbine engine blade; however, the invention is also applicable to the production of a fibrous structure for the production of a metal reinforcement of a metal turbine engine blade, for the production of a metal reinforcement of a leading edge of a turbine engine blade, for the production of a metal reinforcement of a propeller.

The other advantages of the invention are in particular the following:

- reduction of production costs;
- reduction of production time;
- simplification of the production range;
- reduction of material costs.

The invention claimed is:

1. A method of production of a three-dimensional fibrous metal structure by weaving with metal weft threads and metal warp threads, the method comprising:
   producing a plurality of metal clasps by bending metal segments, each of said metal clasps including a first arm extending along a first direction and a second arm extending along a second direction that is different from the first direction, the first arm and the second arm connected to one another by a joining element, and
   after said producing, weaving in three dimensions by successive weaving of the plurality of separate metal clasps acting as weft threads, said weaving being carried out into a first weaving plane formed by a plurality of the first arms successively positioned one next to another and a separate second weaving plane formed by a plurality of the second arms successively positioned one next to another by the introduction of each first arm and each second arm of each of said metal clasps into at least one shed, each shed being formed by two warp threads.

2. The method of production according to claim 1, wherein the metal segments are of rectilinear shape.

3. The method of production according to claim 2, wherein, prior to said bending, said method comprises cutting a plurality of metal segments.

4. The method of production according to claim 2, wherein said metal clasps are bent during said bending into a U-shape and/or a V-shape.

5. A fibrous structure produced by the method of production according to claim 1, wherein said fibrous structure is formed by a plurality of woven warp threads and a plurality of woven weft threads, the weft threads being formed by preformed metal clasps.

6. The fibrous structure according to claim 5, wherein said plurality of warp threads and said plurality of weft threads are metal threads based on titanium and/or SiC-titanium threads and/or SiC-boron threads and/or SiC—SiC threads.

* * * * *